(No Model.) 2 Sheets—Sheet 1.
J. PASZKOWSKI.
HARNESS.
No. 530,123. Patented Dec. 4, 1894.
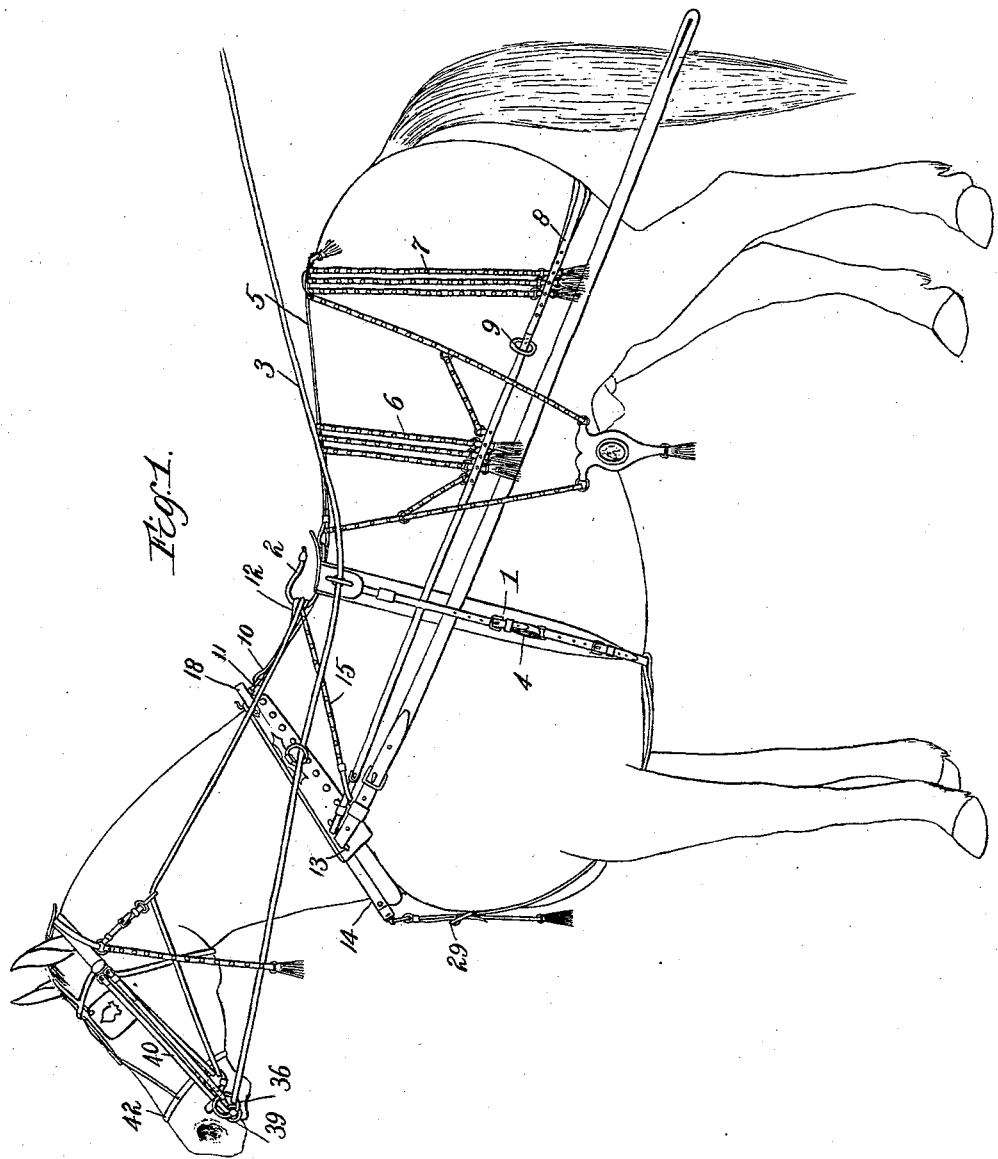
Witnesses.
Wm M. Rheem
Edna B. Johnson
Inventor.
Jan Paszkowski,
by Elliott & Hopkins
Atty's.

(No Model.) 2 Sheets—Sheet 2.
J. PASZKOWSKI.
HARNESS.
No. 530,123. Patented Dec. 4, 1894.
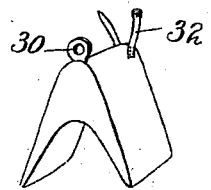
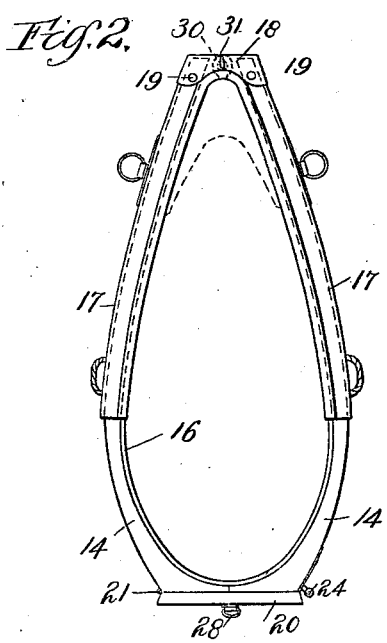
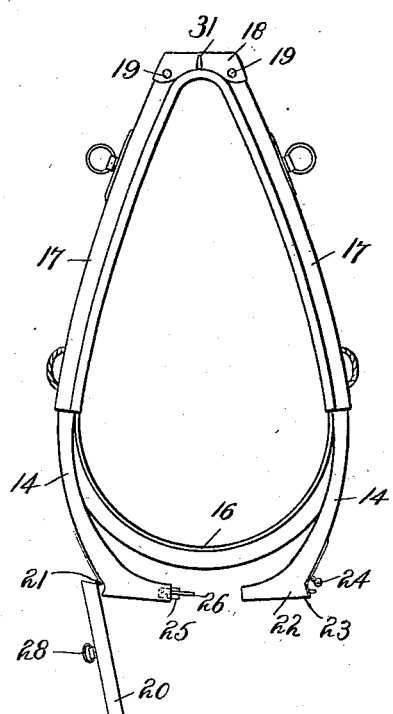
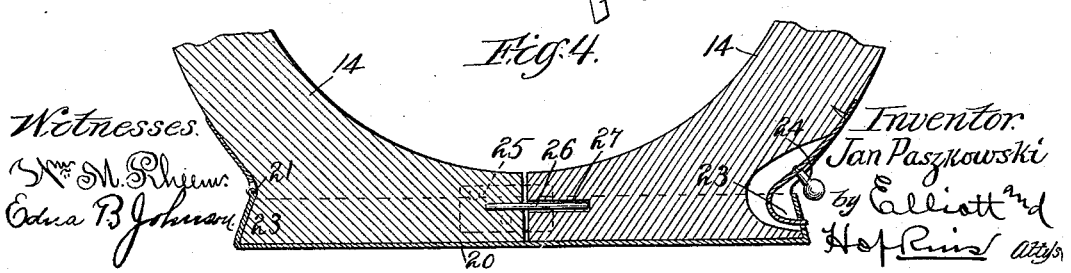
Witnesses  
Inventor  
Jan Paszkowski

UNITED STATES PATENT OFFICE.

JAN PASZKOWSKI, OF CHICAGO, ILLINOIS.

HARNESS.

SPECIFICATION forming part of Letters Patent No. 530,123, dated December 4, 1894.

Application filed December 29, 1893. Serial No. 495,150. (No model.)

*To all whom it may concern:*

Be it known that I, JAN PASZKOWSKI, a subject of the Czar of Russia, residing at Chicago, in the county of Cook and State of Illinois, have invented certain new and useful Improvements in Harness, of which the following is a full, clear, and exact specification.

My improvements relate to the entire harness and the invention has for one of its objects to connect together all of the essential parts excepting the bridle, of a harness capable of being utilized as a single or a double harness, so that the whole harness may be handled as one piece, and the parts will be fixed in their proper relations to each other.

Another object of my invention is to so combine and improve the collar and hames that they may be handled as a single piece and readily placed on the horse's neck without taking them apart.

With these ends in view my invention consists in certain features of novelty hereinafter described with reference to the accompanying drawings and more particularly pointed out in the claims.

In the said drawings, Figure 1 is a general view of my entire harness including the bridle, showing the same in position on a horse. Fig. 2 is an enlarged front view of my improved combined collar and hames. Fig. 3 is a similar view of the same showing the hames and collar spread apart for the reception of the horse's head. Fig. 4 is a vertical sectional view of the lower ends of the hames on a larger scale, and Fig. 5 is a perspective view of a pad or filling designed to be used in connection with my improved collar for making it fit necks of different sizes and shapes.

Like signs of reference indicate like parts throughout the several views.

Referring to Fig. 1, 1 is a saddle provided with the usual hook 2 for the overdraw or check, the rings for the reins 3, and the shaft-tugs 4, all of which may be similar to the construction of an ordinary single harness saddle. To the rear side of the saddle is attached the usual strap 5 which leads rearwardly along the horse's back and to which are secured the straps 6—7 whose lower ends are connected on each side of the horse to a breeching 8 similar to the breeching employed in an ordinary double harness. The breeching is provided on each side with a ring 9 to which the usual breeching strap, not shown, may be secured for fastening the breeching to the shafts, when the harness is used as a single harness. The forward side of the saddle is secured to the combined collar and hames, by means of a strap 10. This connection may be effected by passing the forward end of the strap through a loop or ring 11 secured to the combined collar and hames, while its rear end is attached to the saddle in any convenient way such as by means of an ordinary loop 12 through which the hook 2 passes.

The forward ends of the breeching 8 are detachably secured to rings or loops 13 on the hames 14 in the ordinary manner; and such forward ends of the breeching are also attached on each side to a diagonal strap 15 which passes over the horse's back and is secured to the loop 12; thus providing the saddle with a further connection with the collar and serving to hold the forward ends of the breeching up in place and out of the dirt when detached from the hames. By this construction it will be seen that the collar, hames, saddle and breeching are connected together and held in their respective positions with relation to each other, and the whole harness thus constructed may be handled as a single piece, whereby the operation of harnessing the horse is greatly simplified.

If desired when the harness is used as a double harness the saddle 1 may be entirely detached and the loop 12 connected directly with the forward end of the strap 5. When this is done the straps 15 will act as brace straps or guys to hold the straps 5—10 in place upon the horse's back and will also serve to prevent the lower side of the collar from slipping downward on the horse's neck when the head is lowered, it being understood that the breeching 8, is ordinarily too loose for this purpose.

Referring now more particularly to Figs. 2 to 5 inclusive, 16 represents the collar proper which is of the usual continuous form adapted to be forced over the horse's head, and around which is placed the pair of hames 14. The hames are bound to the collar so as to be practically in one piece therewith in such a manner that when they are unlocked or opened at their lower ends they, together with the sides of the collar may be sprung apart sufficiently to admit the horse's head. To this end the collar throughout the greater portion of the length of the hames at their upper ends, is provided on each side with an envelope 17 which incloses the upper end of the hame and binds it firmly to the collar, the upper extremities of the hames being hinged together and securely held from spreading by a cap 18 and rivets 19. The lower ends of the hames are detachably secured together by a clasp 20 hinged at 21 to one of the hames and being adapted to incase the lower ends of the hames when the latter are forced together, the lower ends of the hames being provided with enlargements 22 whose outer ends slant outwardly as shown at 23 in Fig. 4, and the interior of the clasp being of complementary shape so that the tendency of the hames to spread apart cannot by any possibility release the clasp. After the clasp has been inserted over the enlargements 22 its free end is held in place by means of any suitable latch 24 engaging therewith as indicated in Fig. 4. The inner end of one of the enlargements 22 is provided with a guide-plate and pin 25—26 and the other with a socket 27 for the reception of such pin, the purpose of the plate 25 being to guide the pin into its socket while the purpose of the pin is to hold the ends of the hames in alignment while the clasp 20 is forced over them. The lower side of the clasp 20 may be provided with a loop 28 for the attachment of the martingale strap 29. See Fig. 1.

In order that my combined collar and hames may be fitted to horses' necks of various sizes and shapes I provide various sizes of pads or fillings like that shown in Fig. 5, whose upper edge is provided at one side with a loop 30 which engages over a hook 31 on the cap 18, and on the other side with suitable straps 32 by means of which it may be secured to the loop 11, see Fig. 1, also formed on or secured to the cap 18. The under side of this pad or filling is approximately the shape of the back of the horse's neck while its lower ends are attenuated so as to slope gradually into line with the inner sides of the collar as shown in dotted lines in Fig. 2.

Having thus described my invention, what I claim as new therein, and desire to secure by Letters Patent, is—

1. In a harness the combination of a combined collar and hames, a breeching connected to said combined collar and hames, the straps 6—7 adapted to pass over the animal's back for supporting said breeching, the strap 5 arranged to extend along the animal's back and being secured to the said straps 6—7, and the strap 10 secured to the upper part of said combined collar and hames and having connection with said strap 5, and the straps 15 connected to the strap 10 and having connection with the forward ends of said breeching, substantially as set forth.

2. The combination with a collar having the envelopes 17, of the hames having their upper ends hinged together inserted in said envelopes and their lower ends projecting therefrom, and means for detachably securing the lower ends of said hames together, substantially as set forth.

3. The combination with a collar, of a pair of hames having the enlargements 22 and a cup-shaped clasp adapted to fit over said enlargements for securing the hames together, substantially as set forth.

4. The combination with a collar, of a pair of hames having the enlargements 22 provided with outwardly beveled ends 23, and a clasp hinged to one of said hames and having an interior complementary in shape to said enlargements and adapted to fit over the same, substantially as set forth.

5. The combination with a collar, of the hames having the plate 25 and pin 26 projecting from their opposed ends and the socket 27 in the end of one of the hames for receiving said pin, and a clasp adapted to fit over the ends of said hames for securing them together, substantially as set forth.

6. The combination of a continuous flexible collar having the envelopes 17 extending from the upper part thereof downward and terminating at a considerable distance from the lower part thereof, the hames having their upper ends inserted in said envelopes respectively and their lower ends protruding therefrom and being free, the cap 18 fitting over the upper ends of said hames and collar and hinging the hames together and a latch arranged at the lower ends of said hames for securing them together, substantially as set forth.

JAN PASZKOWSKI.

Witnesses:
F. A. HOPKINS,
EDNA B. JOHNSON.